(12) United States Patent
vonThenen

(10) Patent No.: US 9,389,964 B1
(45) Date of Patent: *Jul. 12, 2016

(54) READ-WRITE ACCESS IN A READ-ONLY ENVIRONMENT

(71) Applicant: EMC Corporation, Hopkinton, MA (US)

(72) Inventor: David vonThenen, Tustin, CA (US)

(73) Assignee: EMC CORPORATION, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/875,546

(22) Filed: Oct. 5, 2015

Related U.S. Application Data

(63) Continuation of application No. 13/966,163, filed on Aug. 13, 2013, now Pat. No. 9,152,342.

(60) Provisional application No. 61/812,679, filed on Apr. 16, 2013.

(51) Int. Cl.
G06F 12/00 (2006.01)
G06F 3/06 (2006.01)
G06F 11/14 (2006.01)

(52) U.S. Cl.
CPC ............ *G06F 11/1451* (2013.01); *G06F 3/065* (2013.01); *G06F 3/067* (2013.01); *G06F 3/0619* (2013.01); *G06F 3/0643* (2013.01); *G06F 11/1464* (2013.01); *G06F 2201/84* (2013.01)

(58) Field of Classification Search
CPC ... G06F 11/1451; G06F 3/067; G06F 3/0643; G06F 3/065; G06F 3/0619; G06F 11/1464; G06F 2201/84

See application file for complete search history.

(56) References Cited

U.S. PATENT DOCUMENTS

| | | |
|---|---|---|
| 8,065,479 B2 | 11/2011 | Humlicek |
| 8,214,367 B2 | 7/2012 | Baratto et al. |
| 8,234,468 B1 | 7/2012 | Deshmukh et al. |
| 8,966,188 B1 | 2/2015 | Bardale |
| 2013/0339301 A1 | 12/2013 | Saito et al. |
| 2013/0339954 A1 | 12/2013 | Tsikrin |
| 2015/0046401 A1 | 2/2015 | Xing |
| 2015/0193350 A1 | 7/2015 | Zhu |

OTHER PUBLICATIONS

U.S. Appl. No. 13/966,009, mailed Jun. 10, 2015, US Office Action.
U.S. Appl. No. 13/966,065, mailed Jul. 24, 2015, US Notice of Allowance.
U.S. Appl. No. 13/966,163, mailed Aug. 11, 2015, US Notice of Allowance.
U.S. Appl. No. 13/966,009, mailed Dec. 17, 2015, US Final Office Action.
U.S. Appl. No. 13/966,009, mailed Feb. 26, 2016, US Office Action.

*Primary Examiner* — John Lane
(74) *Attorney, Agent, or Firm* — Workman Nydegger

(57) ABSTRACT

In one example, a method for processing data includes receiving a request to perform an operation concerning stored data that is 'read only' data. The request includes one or more data blocks, and has an offset and an end. Next, a data structure is created that is a representation of the stored 'read only' data with which the request is concerned, and the data structure includes data blocks. Finally, the requested operation is performed with respect to the data blocks of the data structure, but without modification of the stored 'read only' data to which those data blocks correspond.

20 Claims, 9 Drawing Sheets

READ-WRITE ACCESS IN A READ-ONLY ENVIRONMENT

RELATED APPLICATIONS

This application is a continuation of U.S. patent application Ser. No. 13/966,163 filed on Aug. 13, 2013 (issued as U.S. Pat. No. 9,152,342), entitled READ-WRITE ACCESS IN A READ-ONLY ENVIRONMENT, which claims priority to U.S. Provisional Patent Application Ser. No. 61/812,679, entitled READ WRITE ACCESS IN A READ ONLY ENVIRONMENT, and filed on Apr. 16, 2013. As well, this application is related to: U.S. patent application Ser. No. 13/966,009, entitled READ-WRITE ACCESS IN A READ-ONLY ENVIRONMENT, and filed on Aug. 13, 2013; and, to U.S. patent application Ser. No. 13/966,065, entitled READ-WRITE ACCESS IN A READ-ONLY ENVIRONMENT, and filed on Aug. 13, 2013 (issued as U.S. Pat. No. 9,152,545). All of the aforementioned applications and patents are incorporated herein in their respective entireties by this reference.

FIELD OF THE INVENTION

Embodiments of the present invention relate to backing up data. More particularly, embodiments of the invention relate to systems, hardware, computer-readable media, and methods for reading and writing data in various environments.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up critical data so that in the event of a natural disaster, unauthorized access, or other events, the entity can recover any data that was compromised or lost.

Often, the backed up data is stored in a 'read only' format. However, some applications require not only read access to the backed up data, but also write access to the backed up data, that is, such applications require read-write access. Since the data is stored in a 'read only' format however, such applications are unable to perform the necessary write operations to that data.

In light of the foregoing, it would be useful to be able to provide read-write access to 'read only' data, such as backed up data for example, in such a way that the necessary read and write operations can be performed without modifying or compromising the 'read only' data in any material way. As well, it would be useful to be able to perform defragmentation of data substantially contemporaneously with the writing of the data so as to form contiguous, consolidated data blocks.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
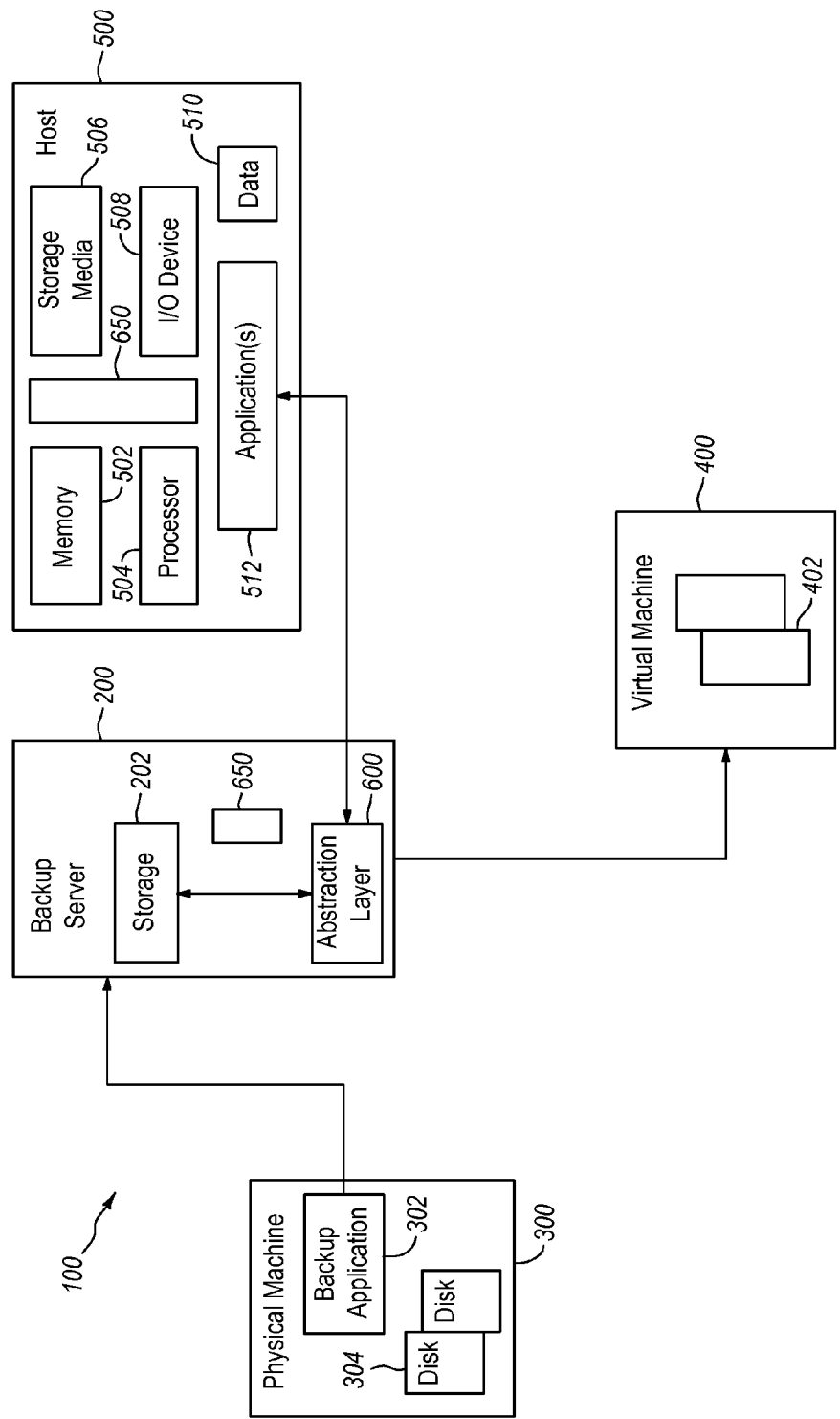
FIGS. 1a-1d are directed to different example environments and configurations of embodiments of the invention.

Embodiments of the present invention relate generally to recovering data for restoration to one or more targets. At least some embodiments are employed in an environment where backups are stored that can be restored to a target device or devices. More particular example embodiments of the invention relate to systems, hardware, computer-readable media and methods for defining and/or executing read and/or write processes with respect to backed up 'read only' data.

In at least some embodiments, an abstraction layer is provided that intercepts a write request directed to underlying 'read only' data. The abstraction layer can reside in any location where it is able to intercept write requests that are directed to 'read only' data which may be stored, for example, at one or more virtual machines. Such write requests can be issued by an application, and the 'read only' data may be backup data, although neither of these is required.

When the underlying data is read/written to, the abstraction layer can be instructed to either commit the data to underlying structure, that is, modify the underlying data, or dismiss the write data thereby leaving the underlying data unaltered. Since both the offsets and data for writes are known, the list of write data blocks can be walked and then written to the underlying data.

The abstraction layer operates in conjunction with a data structure, such as a balanced search tree for example, to which one or more blocks of an intercepted write request can be added, and which enables the added write blocks to be mapped for later use. In one implementation, the data structure includes the offset of a block to be written, as well as the size of that block. The payload of the block to be written may be stored remotely from the data structure. Each write block in the data structure is associated with an identifier, such as the offset for example, that uniquely identifies that particular block.

As well, each write block in the data structure is associated with a full file path that uniquely identifies a file object construct to which that block will be written. In general, the file object construct is a representation of the structure of the 'read only' data, and is stored in a hashmap in association with its unique full file path. When a 'read only' file is opened that is intended to be written to, the hashmap can retrieve the file object construct implicated by the write request and add the corresponding write blocks to the data structure.

Defragmentation of the write data is performed in connection with at least some write processes. The defragmentation can be performed substantially contemporaneously with the write process, that is, substantially in real time with the write process, or at some other time.

The write and defragmentation processes can be performed in various ways depending, for example, on considerations such as the size and offset of blocks previously written, and the size and offsets of blocks planned to be written. For example, a data block planned to be written may overlap with a previously written data block occurring before, or after, the data block planned to be written. This overlap is eliminated by merging the data block planned to be written with either an overlapping data block whose offset precedes the offset of the data block planned to be written, or with an overlapping data block whose offset precedes the end of the data block planned to be written.

As may be evident from the preceding discussion, and other disclosure herein, embodiments of the invention may provide various advantages, although it is not necessary, or required, that any particular embodiment(s), provide any particular advantage(s). Moreover, and consistent with the foregoing, embodiments within the scope of one or more claims may additionally, or alternatively, provide one or more advantages not specifically enumerated herein. Finally, to the extent that possible advantages are enumerated herein, those may be present in one or more embodiments in any combination.

At least some embodiments of the invention may enable defragmentation of data blocks 'on the fly,' that is, as the data blocks are written. In general, such defragmentation, and the contiguous storage of the data blocks, can enable more efficient storage of data, and relatively quicker read and/or write processes, since the written data blocks are contiguous to each other. As well, performing defragmentation in real-time, or near real time, with the write process may obviate the need to schedule and carry out defragmentation at a later time.

A. Example Operating Environments

FIGS. 1a-1d disclose example configurations and environments of embodiments of the invention, such as example operating environment 100. The environment 100 may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. Moreover, any combination of the elements indicated in FIGS. 1a-1d may be implemented in a cloud or internet environment or other networked environment.

As indicated in FIGS. 1a-1d, the example environment 100 includes a backup server 200 configured for communication with one or more clients 300, and one or more target machines 400. In general, backups created in connection with the backup server 200 can be restored to the client 300 and/or the target machine 400. The client 300 and/or the backup host 400 may be physical machines, virtual machines, or any other suitable type of device. Additionally, one or more hosts 500 may be present in the operating environment 100.

With particular reference first to the backup server 200 and the client 300, the backup server 200 generally operates to create, or cause the creation of, one or more backups of data that is resident at the client 300. In some implementations, the backup server 200 is an EMC Corp. AVAMAR server or NetWorker server, although the scope of the invention is not limited to those example servers. The backup server 200 operates in conjunction with a backup application 302, which is a data de-duplication application in some embodiments, of the client 300 to backup data residing on storage media 304, such as disks for example, of the client 300. The backups thus created, which comprise de-duplicated backups in some embodiments, are stored on the storage media 202 of the backup server 200. The backups may be restored to the client 300 and/or to storage media 402 of the target machine 400, and/or to any other machines.

As noted above, the environment 100 may include one or more hosts 500. The number of hosts 500 in the environment 100 can vary, and the hosts can be of different types. In one example, one or more hosts 500 may all be part of the same network or associated with the same entity. The one or more hosts 500 can include, by way of example only, servers (e.g., a file server, an email server), computers (e.g., desktop computers, laptop computers, tablet devices, smartphones), virtual machines, databases, or any combination thereof. Each of the one or more hosts 500 can be associated with its own data. As well, a host 500 may generally be any device that includes one or more applications which require read-write access to a backup, such as the backups residing at the backup server 200. As such, the host 500 or any other device that requires read-write access to 'read only' data, which may or may not be backup data, may transmit both read and write requests concerning that 'read only' data.

In the examples of FIGS. 1a-1d, the host 500 is a machine, such as a computing device, that includes a memory 502, one or more processors 504, storage media 506, and I/O device 508, data storage 510. As well, one or more applications 512 are provided that comprise executable instructions. One or more of the target machine 400, client 300 and backup server 200 may likewise include any one or more of the aforementioned elements of example host 500, in any combination.

B. Example Abstraction Layers

With continued reference to FIGS. 1a-1d, and particular reference to FIG. 1a, the example implementation in that figure further includes an abstraction layer 600. In general, the abstraction layer 600 intercepts write requests directed to 'read only' data, such as a backup for example, and creates, or enables the creation of, one or more file object constructs, discussed in more detail elsewhere herein, that mimic the structure and content of the 'read only' data to which the write request is directed. When a 'read only' file is opened for modification, the file object construct(s) associated with the write request are modified, if necessary, to include the data blocks of the write request.

Thus, the abstraction layer, through the file object constructs, can be thought of as virtualizing 'read only' data and/or any other data whose integrity is desired to be preserved, so as to enable the originator of the write request to manipulate a representation of the 'read only' data in any desired manner, including viewing, reading, writing, and deleting, but without actually touching the actual underlying data. This functionality can be useful in a variety of circumstances. By way of illustration, this functionality allows testing to be performed with respect to the 'read only' data without any risk to the integrity of that data. Finally, and as noted elsewhere herein, the abstraction layer 600 functionality is not limited to interception of write requests. The abstraction layer 600 may also enable a user to both dismiss the write request, that is, leave the underlying 'read only' data unmodified, and to commit, that is, write, the write blocks to the underlying data with, as/if desired.

Generally, the abstraction layer 600 can be configured in any way that enables it to intercept write requests directed to 'read only' data. As such, the abstraction layer 600 is not required to reside in any particular device or location. In some instances, the 'read only' data is a backup, but that is not necessary. More generally, the abstraction layer 600 can be employed in connection with any 'read only' or 'read-write' files and systems where it is desired to be able to avoid changes to the underlying data. Other examples of 'read only' data, and associated applications, in connection with which embodiments of the invention may be employed include, but are not limited to full backups, partial backups, snapshots, mirrored copies and de-duplicated backups. In some instances, a single abstraction layer can serve multiple applications and/or 'read only' data stores while, in other instances, an abstraction layer may be employed for each of multiple different applications and/or 'read only' data stores.

The abstraction layer 600 may be controlled by the application generating the write requests and/or by the backup server that receives the write requests. Additionally, or alternatively, the abstraction layer 600 may be controlled by a host or other device on which it resides, if that host or other device is other than the backup server or the host of the application(s) issuing the write requests. The application(s) generating write requests can be virtually any application. Examples include, but are not limited to, snapshot applications, testing applications, and any other application that may require writing to 'read only' data in a backup.

In the particular example of FIG. 1a, the 'read only' backup data is located at storage 202 of the backup server 200. Thus, the abstraction layer 600 is configured to intercept write requests from the application(s) 512 directed to that backup data. Here, the abstraction layer 600 is located in the backup server 200, as indicated. As such, the operation of the abstraction layer 600 is controlled by the backup server 200. It should be noted that the abstraction layer 600 in the arrangement of FIG. 1a may intercept write requests to any number of different backups or other 'read only' data resident on the backup server 200, some or all of which may reside in storage 202 and/or other storage (not shown) associated with the backup server 200.

Figure 1B:
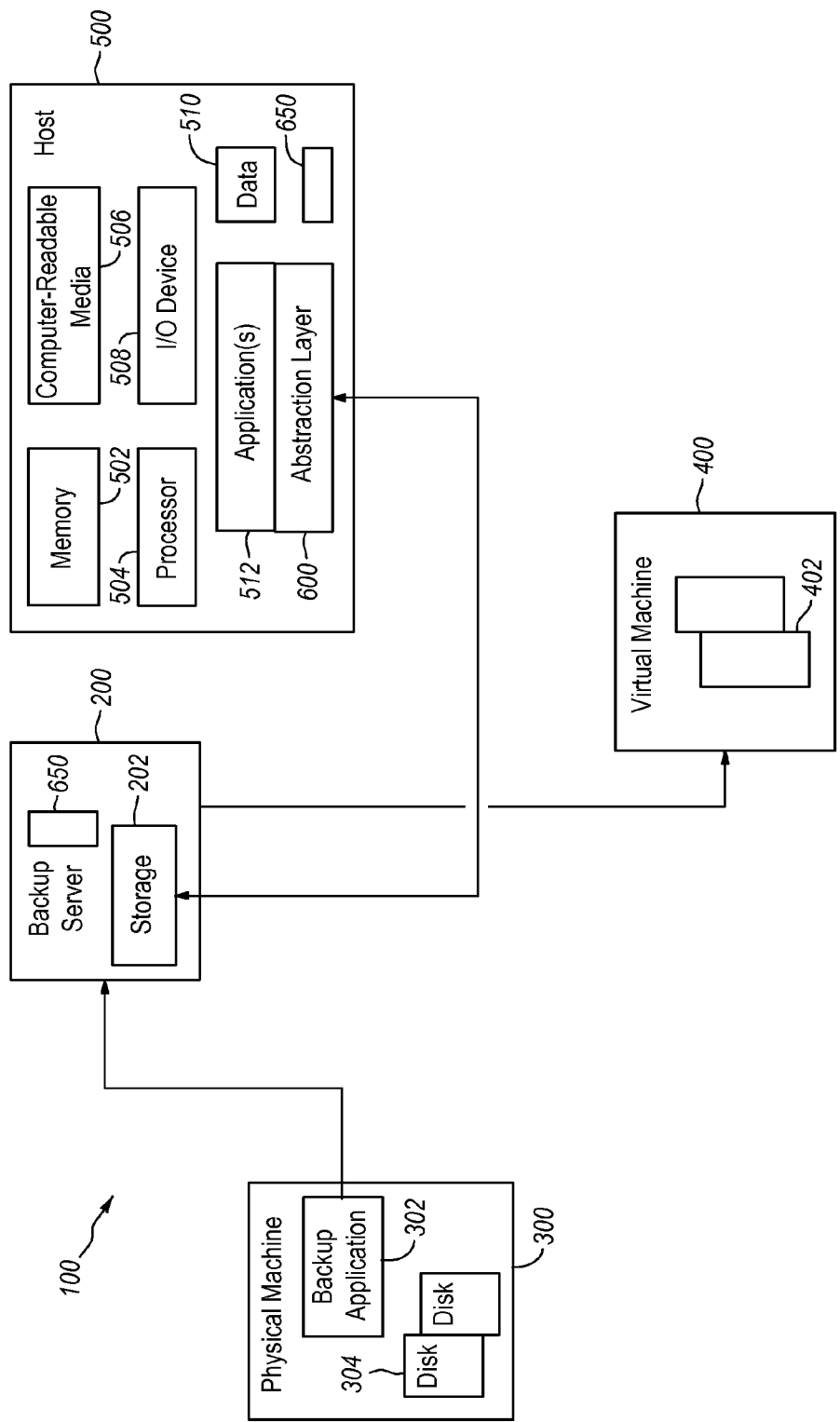

With attention now to FIG. 1b, an alternative configuration involving the abstraction layer 600 is disclosed. In this example, the abstraction layer 600 resides in the host 500 and, as such, the operation of the abstraction layer 600 is controlled by the host 500. Thus configured, the abstraction layer 600 is able to intercept write requests from the application(s) 512 directed to the backup data residing at the backup server 202. As indicated in FIG. 1b, and noted above, the abstraction layer 600 may operate in conjunction with multiple applications 512.

Figure 1C:
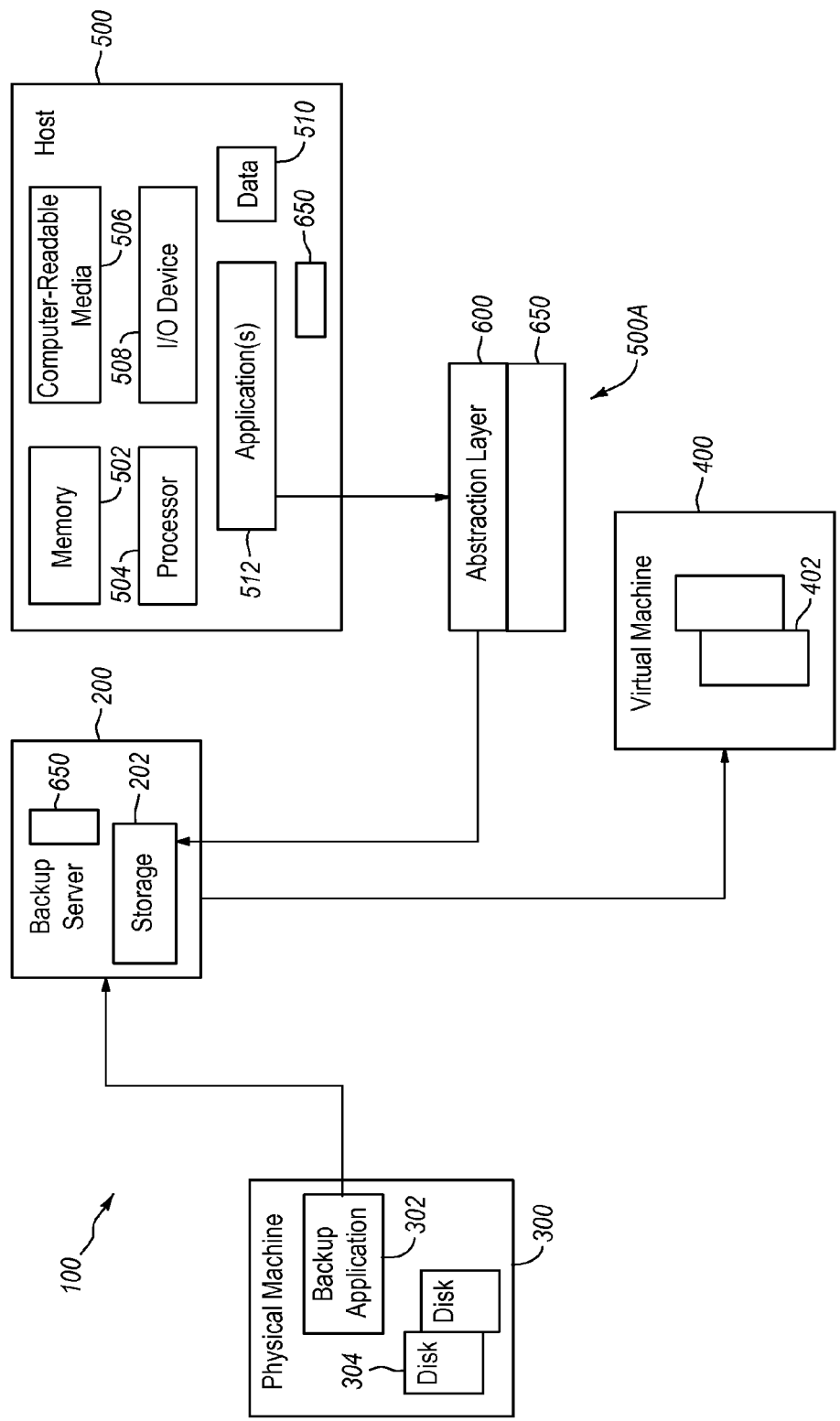

Turning now to FIG. 1c, a further alternative configuration involving the abstraction layer 600 is disclosed. In this example, the abstraction layer 600 resides neither at the backup server 200, nor the host 500, but some other location separate from the backup server 200 and the host 500. For example, the abstraction layer 600 may reside at, and by controlled by, a host 500A. As is the case with the other arrangements disclosed herein, the abstraction layer 600 may serve multiple hosts 500 and/or applications 512, in connection with one more backups stored at one or more backup servers 200.

Figure 1D:
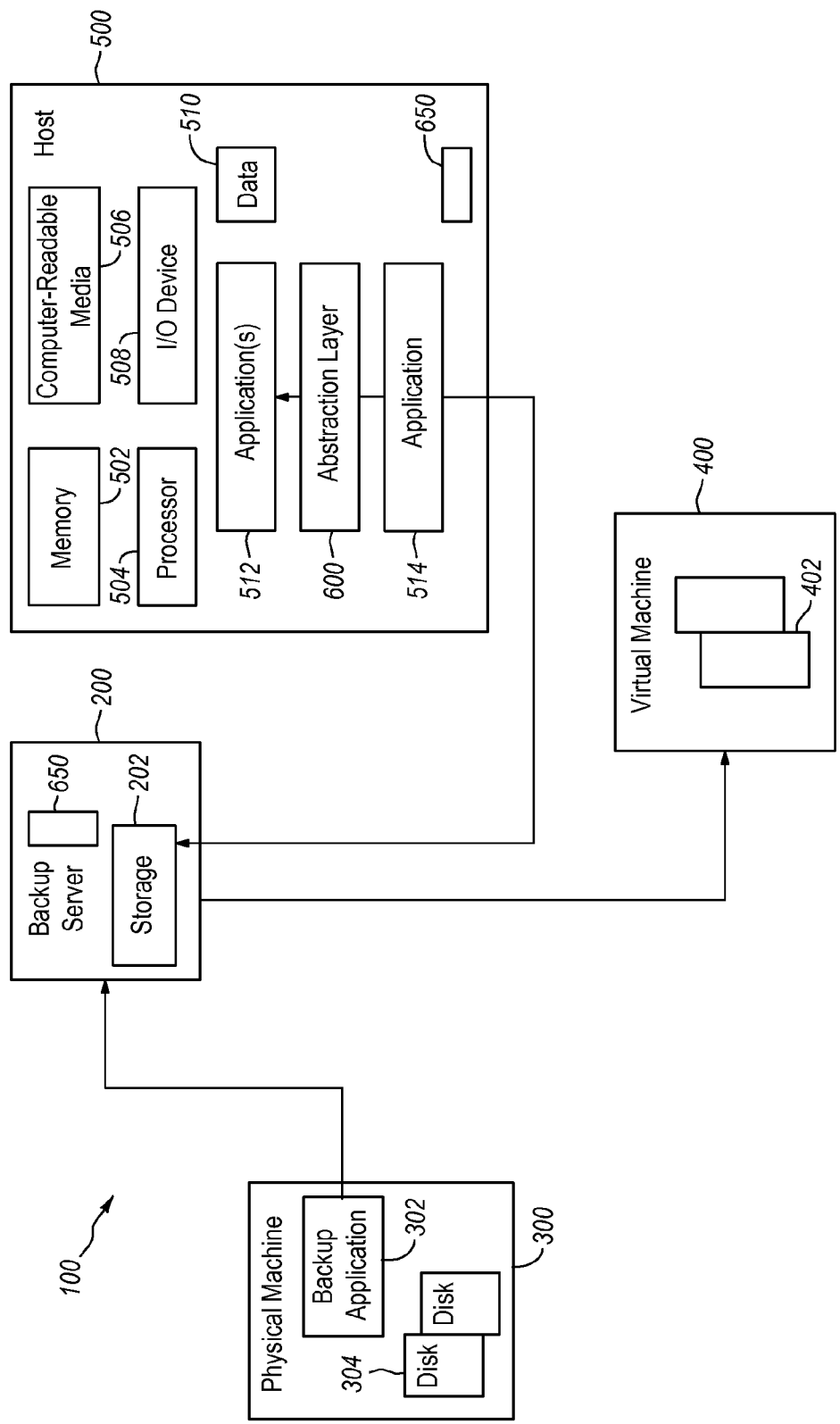

With reference finally to FIG. 1d, a further alternative configuration involving the abstraction layer 600 is disclosed. In this example, the abstraction layer 600 resides between first and second applications 512 and 514, respectively, of a host 500. In one variation of this arrangement, the application 514 resides other than at the host 500, such as the host 500A (FIG. 1c) for example, or some other location. In the arrangement of FIG. 1d, the abstraction layer 600 may intercept write requests issued by the first application 512 to the second application 514 so that the write request can be processed prior to the time that the application 514 communicates with the backup server 200. In a variation of the arrangement of FIG. 1d, both applications 512 and 514, as well as the abstraction layer 600, may be located separately from the backup server 200 and host 500.

C. File Object Constructs and Virtualized Data

Figure 2:
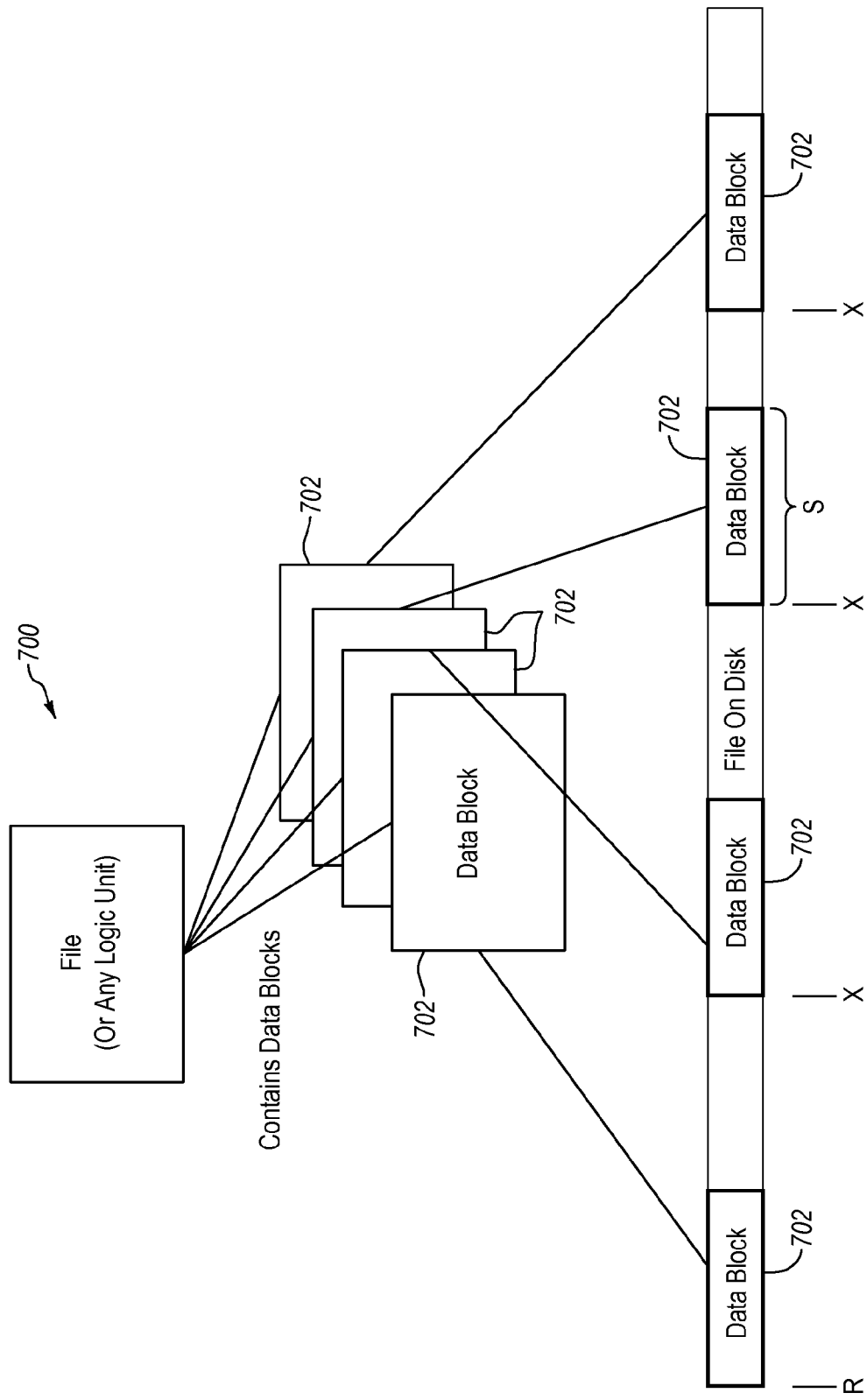
FIG. 2 discloses an example of a portion of a file on storage media.

As disclosed elsewhere herein, example embodiments of the abstraction layer create, or cause the creation of, a representation of stored 'read only' data, such as file 700 of FIG. 2. In at least some embodiments, this representation is implemented as a file object construct, examples of which are disclosed in FIGS. 3 and 4.

As indicated in FIG. 2, the file 700 includes one or more data blocks 702, each of which includes, or is otherwise associated with, an identifier that is unique to that data block 702. One example of such a unique identifier is the offset "X," namely, the distance from the start of the data block 702 to a reference "R" of the file 700. Each data block 702 additionally has a size "S" which can be expressed, for example, in terms of bytes.

Figure 3:
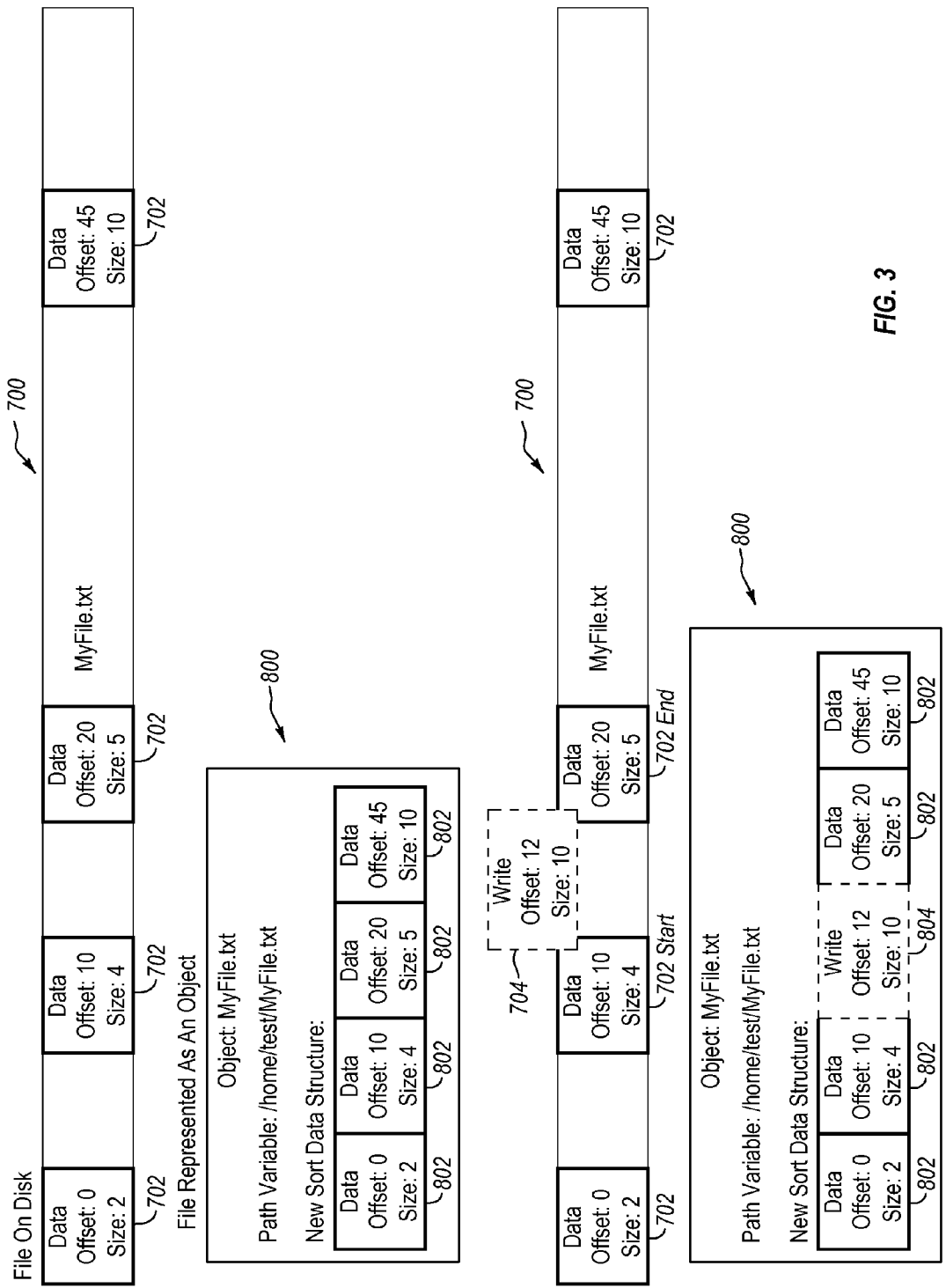
FIG. 3 discloses an example embodiment of a representation of 'read only' data that can be used to enable a write process.

Thus, and with reference now to FIG. 3, the data block 702 with an offset of 0 begins at 'R.' The end of that data block 702 can be determined with reference to the size of the data block, 2 in this case. Thus, the data block 702 having offset 0 and size 2 starts at offset 0 and ends at offset 2. In similar fashion, the other data blocks 702 each have a size and are associated with a particular offset. Thus, when a write to file 700 is specified, the location of the data blocks 702 to be written to the file object construct 800 can be determined by referring to the respective offset associated with each data block 702 of the write request. As noted in FIG. 3, the data blocks 702 residing on the storage media are not necessarily contiguous with each other.

It was noted earlier that each data block of a write request includes or is associated with a respective payload. Typically, although it is not necessarily the case, the data block payloads are stored apart from a file object construct associated with the file 700. For example, the data block payloads can be stored in memory at the server or other device where the 'read only' data resides, or the data block payloads can be stored at the host of the application that issues the write request, or the data block payloads can be stored in any other suitable location.

With continued reference to FIG. 3, a file object construct 800 with its data blocks 802 serves as a representation of the underlying 'read only' data 702 of the file 700. The file object construct 800 can represent all, or only a portion, of the file 700. In general, the file object construct 800 can be modified with write requests, without disturbing the underlying data 702 of the file 700.

As further indicated in FIG. 3, the file object construct 800 may have any suitable name, such as 'MyFile.txt' for example, and can be uniquely identified by its full path, for example. In the example of FIG. 3, the full path of the file object construct 800 is '/home/test/MyFile.txt.' Finally, the file object construct 800 is configured in such a way that successive data blocks 802 are positioned adjacent to each other, notwithstanding that their different offsets and sizes could result in overlap if the blocks 702 of the actual file 700 were positioned in that way on the storage media.

D. Example Write Blocks and Write Operations

With continued reference to FIG. 3, details are now provided concerning aspects of some example write operations relating to the file 700 and corresponding file object construct 800. In general, it may be desirable to determine whether, or how, a write operation may affect previously written data blocks, particularly if the size of that write operation means that the write operation may overlap with one or more previously written data blocks, and thus result in defragmented data and/or non-contiguous storage of data blocks on the disk or other media.

For example, a write operation performed in response to write request 704 will position the block(s) of the write request 704 based on the offset and size of the write request. In this particular example, it can be seen that the blocks of the write request 704, by virtue of their offset and aggregate size, will overlap the immediately preceding and immediately following, also referred to as 'leading' and 'trailing,' data blocks 702START and 702END, respectively, when the write operation associated with the write request 704 is carried out.

The write operation associated with the write request 704 can be reflected in the file object construct 800 as indicated at the bottom of FIG. 3. In particular, the data block(s) associated with the write request 704 are positioned between the data blocks 802 of the file object construct 800 that correspond, respectively, to 702START and 702END.

While the file 700 configuration discussed above will permit the data block(s) of write request 704 to be read out, the read process may necessitate a search for, and the reading out of, data blocks 702START and 702END, since those blocks contribute to a read request that is directed to the blocks of the write request 704. As well, writing the blocks of the read request in the manner indicated in FIG. 3 may in some instances result in fragmented data. While fragmented data is not necessarily problematic, per se, it may be desirable in some instances to defragment data to better facilitate storage of the data, and reading out of the data.

In light of the foregoing and/or other considerations, some embodiments of the invention provide for merging the data block(s) of a write request with the previously written data block(s) immediately preceding and/or following those of the write request. Accordingly, attention is directed now to FIG. 4 which discloses aspects of some example write processes. Such write processes may, but need not necessarily, be directed to 'read only' data in such a way that a representation of the 'read only' data, such as a file object construct for example, is modified by the write request, while the underlying 'read only' data remains undisturbed.

Figure 4:
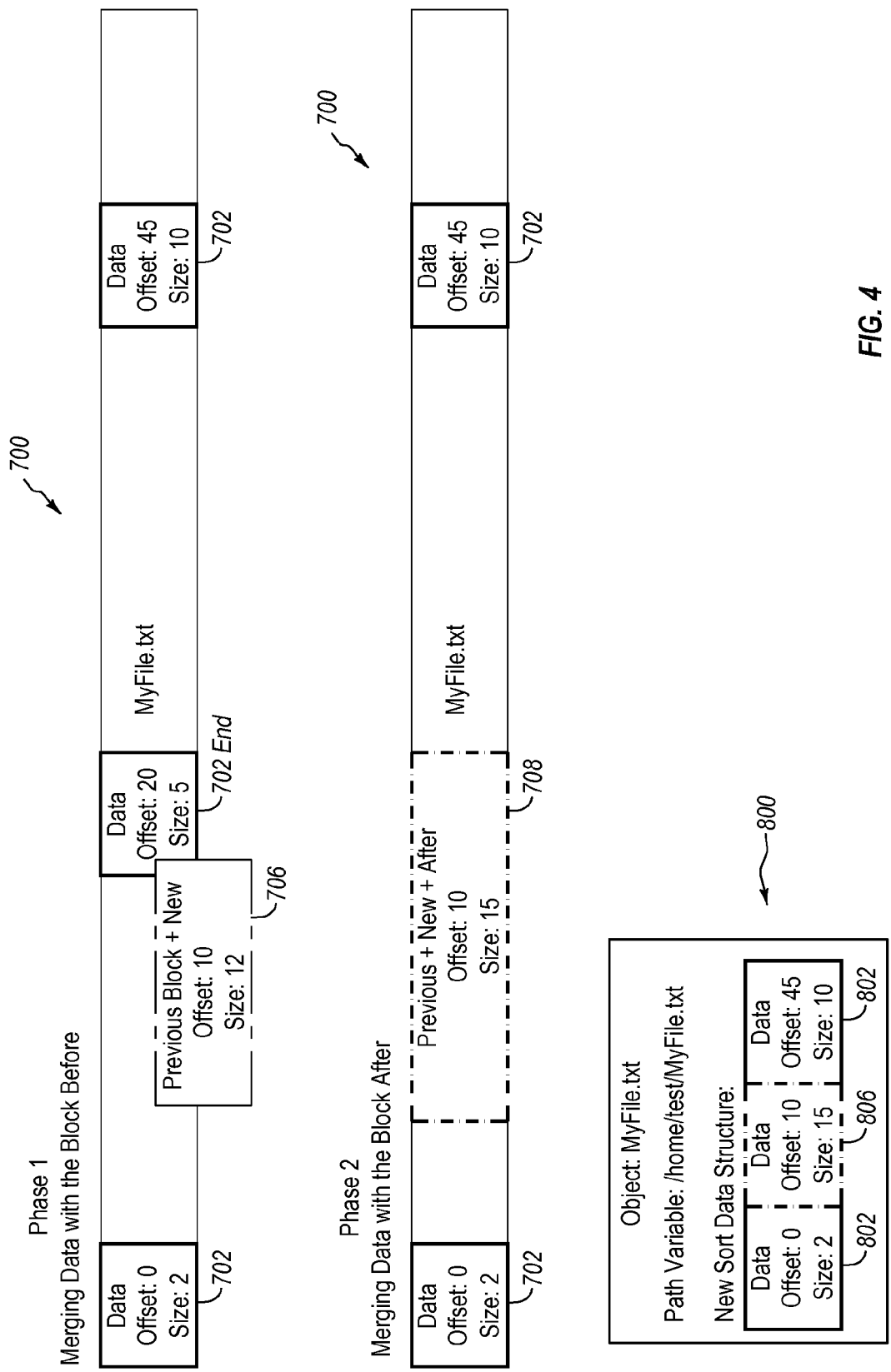
FIG. 4 discloses an example embodiment of a representation of data after defragmentation.

As indicated in FIG. 4, and previously in FIG. 3, a file 700 includes one or more data blocks 702, each of which is associated with a unique identifier, such as an offset for example, and each of which has a size. An example write operation associated with write request 704 (see FIG. 3) can be implemented in two phases, although that is not required. In general, the first phase involves merging, if necessary, the data block(s) associated with the write request 704 with a data block 702START whose offset immediately precedes the offset of the data block(s) of the write request 704.

More specifically, the offset of the write request 704 is determined so that the block whose offset immediately precedes the offset of the write request 704, data block 702START in this case, can be identified. Once that block has been identified, the last position of that block can be calculated by adding the size of the block to the block offset. If the last position is less than the offset of the first block of the write request 704, then there is no overlap between the data block 702START and the data block(s) associated with the write request 704, and the block(s) of the write request 704 can simply be added to the file object construct 800. Thus, in this scenario, there is no need to merge the block(s) associated with the write request 704 with the data block 702START.

On the other hand, if the last position is determined to be greater than, or equal to, the offset of the write request 704, the data block 702START overlaps the write request 704 and, accordingly, the block(s) of the write request 704 are merged with the data block 702START to produce the merged, defragmented block 706. As indicated in FIG. 4, the merged, defragmented block 706 accordingly includes a 'previous block,' such as 702START, merged together with one or more 'new' blocks, that is, the block(s) of the write request 704.

As with other example data blocks disclosed herein, the merged, defragmented block 706 can have a unique identifier, such as an offset, and a size. In the illustrative example of FIG. 4, the merged, defragmented block 706 has an offset of 10, which is the offset of the data block 702START. Although the size of the data block 702START is 4, and the size of the block(s) of the write request is 10, the resulting size of the merged, defragmented block 706 is 12, rather than 14, that is, the sum of 4 and 10. This is because data block 702START and the block(s) of the write request 704 overlap by 2, as indicated in FIG. 4. That is, data block 702START ends at offset 14, while the data block(s) of the write request 704 start at offset 12, thereby resulting an overlap of 2. This result demonstrates that merging of data blocks can reduce storage requirements, while also defragmenting the data.

While the preceding discussion concerns the merger of the data block(s) of the write request 704 with an immediately preceding data block to produce the merged, defragmented block 706, alternative embodiments are contemplated where the merged, defragmented block 706 is formed by merging the data block(s) of the write request 704 with a data block that immediately follows the data block(s) of the write request 704.

In still other embodiments, one example of which is discussed below, it may be useful to additionally merge the merged, defragmented block 706 with a data block that immediately follows the merged, defragmented block 706. In these latter embodiments, the data block(s) of the write request 704 can be merged with the immediately preceding data block and immediately following data block in any order. That is, it is not required that the data block(s) of the write request 704 first be merged with the immediately preceding data block and then with immediately following data block. In fact, these mergers could proceed in the reverse order.

As noted above, it may be useful to additionally merge the merged, defragmented block 706 with a data block that immediately follows the merged, defragmented block 706. This can be done by determining the last position of the merged block 706. This last position is simply the offset 10 of the merged, defragmented block 706 plus the size 12 of the merged block 706. Thus, the last position of the merged, defragmented block 706 is 22. If this last position is less than the offset of the immediately following block, data block 702END in this example, then the immediately following block can simply be added to the file object construct 800. Thus, in this scenario, there is no need to merge the block(s) associated with the write request 704 with the data block 702END.

On the other hand, if the last position is determined to be greater than, or equal to, the offset of the immediately following block, data block 702END in this example, then the block(s) of the merged, defragmented block 706 are merged with the data block 702END to produce a new merged, defragmented block 708. As indicated in FIG. 4, the merged, defragmented block 708 accordingly includes a 'previous block,' such as 702START, merged together with one or more 'new' blocks, that is, the block(s) of the write request 704, and also merged with an 'after' block, such as 702END.

As with other example data blocks disclosed herein, the merged, defragmented block 708 can have a unique identifier, such as an offset, and a size. In the illustrative example of FIG. 4, the new merged, defragmented block 708 has an offset of 10, which is the offset of the old merged, defragmented block 706. Although the size of the merged, defragmented block 706 is 12, and the size of the 702END block is 5, the resulting size of the merged, defragmented block 706 is 15, rather than 17, that is, the sum of 12 and 5. This is because the merged, defragmented block 706 and the block 702END overlap by 2, as indicated in FIG. 4. That is, the merged, defragmented block 706 ends at offset 22, while the block 702END starts at offset 20, thereby resulting an overlap of 2.

With continued reference to FIG. 4, the new merged, defragmented block 708 is represented in the file object construct 800 as data block 806. Moreover, it can also be seen in FIG. 4 that as a result of the merging processes, the file object construct 800 includes only three data blocks, rather than five data blocks as in the example of FIG. 3. This result demonstrates that merging of data blocks can reduce storage requirements, while also defragmenting the data.

E. Example Merge and Defragmentation Processes

Figure 5:
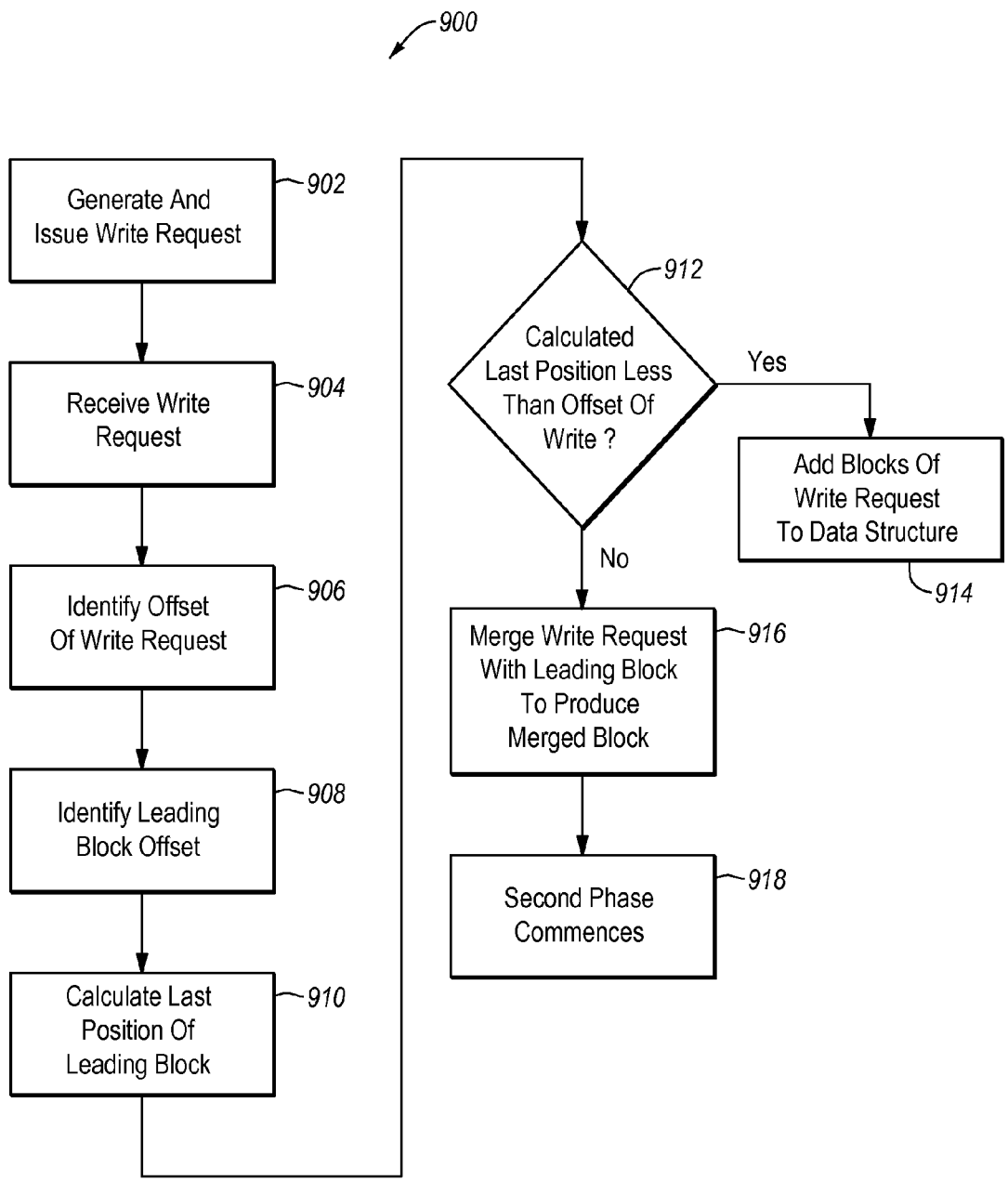
FIG. 5 discloses aspects of an example process for defragmentation of data.

Directing attention now to FIG. 5, details are provided concerning an example process 900 which may be used to merge and store data blocks. The process 900 begins at 902 where a write request is generated and issued, such as by an application for example. In some embodiments, the write request is intercepted, such as by an abstraction layer for example, and the abstraction layer writes, or causes the writing of, the data blocks of the write request. An abstraction layer may be employed where, for example, one or more write requests are directed to 'read only' data. Examples of abstraction layers are disclosed in the related applications incorporated herein by reference.

Regardless of whether an abstraction layer is used or not, the write request is ultimately received at 904 by an entity, such as a backup server for example, where the data object(s) to which the write request is directed resides. As used herein, 'data object' is intended to be broadly construed and embraces, among other things, files, portions of files, directories, and combinations of any of the foregoing. Where an abstraction layer is employed, the write request may be received by an abstraction layer residing, for example, on a backup server, although the abstraction layer may reside elsewhere.

After receipt of the write request, a process is performed that may serve to defragment data, which may be present in a file object construct for example, so as to make contiguous, consolidated data blocks. This process may be performed in real time, or substantially in real-time, as data blocks are written, although that is not necessary. Finally, while the example process discussed below may be performed in multiple parts, other embodiments of the process involve the performance of only one part. As well, the multiple parts in the example process discussed below can be performed in any order.

Referring again now to FIG. 5, a first phase is commenced. The first phase can be performed alone, prior to the second phase (discussed below), or subsequent to the second phase. In general, and depending upon the circumstances, discussed in more detail below, the first phase involves the merging of the data blocks(s) of a write request with the data block immediately preceding the data block(s) of the write request.

In the example of FIG. 5, the first phase is commenced where the offset of the write request is determined 906. This may be accomplished by examining the write request. Once that offset has been determined, the file object construct, or other data structure, is examined and the data block with the immediately preceding offset identified 908. This block may also be referred to as the leading block, that is, its offset is the first offset prior to the offset of the write request, although it may overlap to some extent with the write request. One example of a leading block is data block 702START (see FIG. 3).

After the leading block has been identified, the last position of the leading block is calculated 910. In at least some embodiments, this calculation involves adding the offset of the block to the size of the leading block. The result of the calculation is the last position of the leading block. For example, if a leading block has an offset of 10 and a size of 4, the last position, or offset of the end of the leading block, is the sum of 10 and 4, or 14.

Next, the calculated last position is compared 912 with the offset of the read request. If the calculated last position is less than the offset of the read request, there is no overlap between the leading block and the write request. In this case, the blocks of the write request are simply added 914 to the data structure.

On the other hand, if the calculated last position of the leading block is equal to or greater than the offset of the write request, there is overlap between the leading block and the write request. In this case, the block(s) of the write request are merged 916 with the leading block to produce a merged, defragmented block whose offset is the same as what the offset of the immediately preceding block was, and whose size is equal to the size of the immediately preceding block plus the block(s) of the write request, and less the amount of any overlap between the immediately preceding block and the write request.

Figure 6:
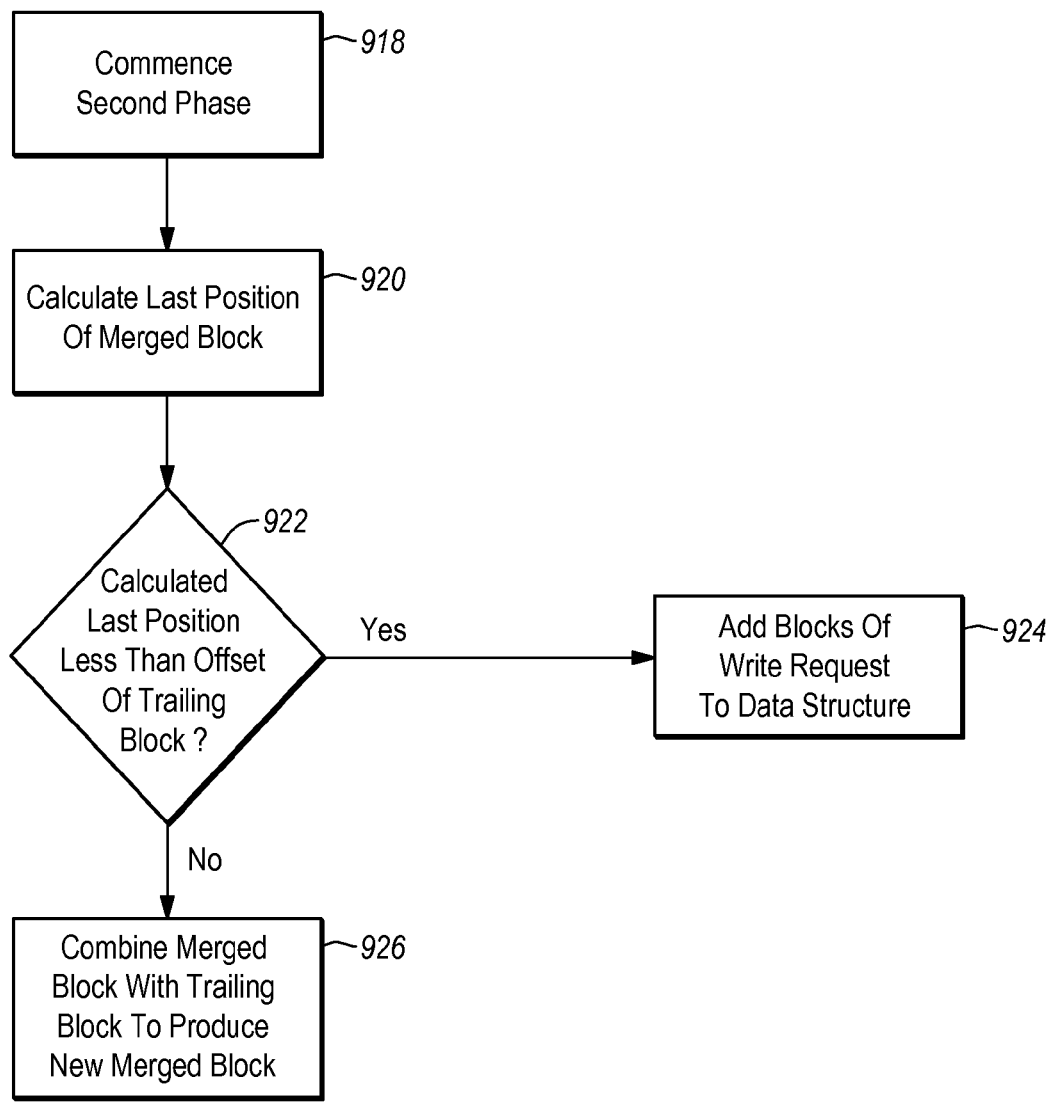
FIG. 6 discloses aspects of an example process for defragmentation of data.

With continued reference to FIG. 5, and directing attention finally to FIG. 6, the second phase, which can be performed alone, prior to the first phase, or subsequent to the first phase, is commenced 918. In general, and depending upon the circumstances, discussed in more detail below, this embodiment of the second phase involves the merging of a merged, defragmented data block, which includes the data block(s) of a write request and the data block that immediately preceded the leading block of the write request, with a trailing data block whose offset is the same, or less than, the last position of the merged, defragmented block.

Initially, the last position of the merged, defragmented block is calculated 920. In at least some embodiments, this calculation involves adding the offset of the merged, defragmented block to the size of the merged, defragmented block. The result of the calculation is the last position of the merged, defragmented block. For example, if a merged, defragmented block has an offset of 10 and a size of 12, the last position, or offset of the end of the merged block, is the sum of 10 and 12, or 22.

Next, the calculated last position of the merged, defragmented block is compared 922 with the offset of the block whose offset is the first block offset following the offset of the merged, defragmented block. As noted elsewhere herein, this block may be referred to as the trailing block, although it may overlap to some extent with the write request. One example of a trailing block is data block 702END (FIG. 3). If the calculated last position is less than the offset of the trailing block, there is no overlap between the trailing block and the merged, defragmented block. In this case, the blocks of the write request are simply added 924 to the data structure.

On the other hand, if the calculated last position of the merged, defragmented block is equal to or greater than the offset of the trailing block, there is overlap between the trailing block and the merged, defragmented block. In this case, the merged, defragmented block is merged 926 with the trailing block to produce a new merged, defragmented block whose offset is the same as what the offset of the old merged block was, and whose size is equal to the size of the old merged, defragmented block plus the trailing block, and less the amount of any overlap between the trailing block and the old merged, defragmented block.

As a result of the performance of one or both of the aforementioned phases, the data blocks are defragmented and stored contiguously with each other in the data structure. The defragmentation can take place substantially contemporaneously with the writing of the data blocks.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for processing data, the method comprising:
    receiving a request concerning stored data that is 'read only' data, the request including one or more data blocks, and the request having an offset and an end, wherein the request comprises a request to perform an operation relating to the stored 'read only' data;
    creating a data structure that is a representation of the stored 'read only' data with which the request is concerned, wherein the data structure includes data blocks; and;
    performing the requested operation with respect to the data blocks of the data structure, wherein the requested operation is performed without modifying the stored 'read only' data,
    wherein the requested operation is one of a view operation, a read operation, a write operation, a testing operation, or a delete operation, and when the requested operation is a write operation, the write operation comprises:
    examining the data structure and identifying an offset of a leading data block residing in the data structure; and
    calculating a last position of the leading data block, and either;
    storing the one or more data blocks of the write request in the data structure, if the last position of the leading data block is less than the offset of the write request; or
    merging the one or more data blocks of the write request with the leading data block to produce a defragmented merged data block and then storing the defragmented merged data block in the data structure, id the last position of the leading data block is equal to or greater than the offset of the write request.

2. The method as recited in claim 1, wherein the request concerning the stored 'read only' data is received by way of an abstraction layer.

3. The method as recited in claim 1, wherein the stored 'read only' data is any of a full backup, a partial backup, a snapshot, a mirror copy, or a deduplicated backup.

4. The method as recited in claim 1, wherein the request concerning the stored 'read only' data is specific to a particular application.

5. The method as recited in claim 1, wherein the data blocks of the data structure are virtualized data blocks of the stored 'read only' data.

6. The method as recited in claim 1, wherein the data structure is a file object construct that represents associated 'read only' data.

7. The method as recited in claim 1, wherein the data structure is a balanced search tree.

8. The method as recited in claim 1, wherein when the requested operation is a write operation, defragmentation of write data is performed substantially contemporaneously with the write operation.

9. The method as recited in claim 8, wherein defragmentation of the write data causes formation of contiguous, consolidated data blocks.

10. The method as recited in claim 1, wherein the data structure is a virtualization of the stored 'read only' data.

11. The method as recited in claim 1, wherein successive data blocks in the data structure are positioned adjacent to each other, notwithstanding that different offsets and sizes of those data blocks could result in overlap if data blocks of a file represented by the data structure were positioned in that way on storage media.

12. A non-transitory physical storage device having stored therein computer-executable instructions which, when executed by one or more hardware processors, process data by:
- receiving a request concerning stored data that is 'read only' data, the request including one or more data blocks, and the request having an offset and an end, wherein the request comprises a request to perform an operation relating to the stored 'read only' data;
- creating a data structure that is a representation of the stored 'read only' data with which the request is concerned, wherein the data structure includes data blocks; and
- performing the requested operation with respect to the data blocks of the data structure, wherein the requested operating is performed without modifying the stored 'read only' data,
- wherein the requested operation is one of a view operation, a read operation, a write operation, a testing operation, or a delete operation, and when the requested operation is a write operation, the write operation comprises;
- examining the data structure and identifying an offset of a leading data block residing in the data structure; and
- calculating a last position of the leading data block, and either;
  - storing the one or more data blocks of the write request in the data structure, if the last position of the leading data block is less than the offset of the write request; or
  - merging the one or more data blocks of the write request with the leading data block to produce a defragmented merged data block and then storing the defragmented merged data block in the data structure, if the last position of the leading data block is equal to or greater than the offset of the write request.

13. The non-transitory physical storage device as recited in claim 12, wherein the request concerning the stored 'read only' data is received by way of an abstraction layer.

14. The non-transitory physical storage device as recited in claim 12, wherein the stored 'read only' data is any of a full backup, a partial backup, a snapshot, a mirror copy, or a deduplicated backup.

15. A backup server, comprising:
- a backup application;
- one or more hardware processors; and
- the non-transitory physical storage device of claim 12.

16. The non-transitory physical storage device as recited in claim 12, wherein the data structure is a balanced search tree.

17. The non-transitory physical storage device as recited in claim 12, wherein when the requested operation is a write operation, defragmentation of write data is performed substantially contemporaneously with the write operation.

18. The non-transitory physical storage device as recited in claim 17, wherein defragmentation of the write data causes formation of contiguous, consolidated data blocks.

19. The non-transitory physical storage device as recited in claim 12, wherein the data structure is a virtualization of the stored 'read only' data.

20. The non-transitory physical storage device as recited in claim 12, wherein successive data blocks in the data structure are positioned adjacent to each other, notwithstanding that different offsets and sizes of those data blocks could result in overlap if data blocks of a file represented by the data structure were positioned in that way on storage media.

* * * * *